(12) United States Patent
Dirisio et al.

(10) Patent No.: US 6,738,568 B1
(45) Date of Patent: May 18, 2004

(54) CAMERA FRAME ASSEMBLY HAVING SHUTTER THAT SLIDES FORWARD AND BACK WITH ZOOM LENS

(75) Inventors: Anthony Dirisio, Rochester, NY (US); David J. Cornell, Scottsville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/325,507

(22) Filed: Dec. 20, 2002

(51) Int. Cl.$^7$ ............................................... G03B 17/02
(52) U.S. Cl. ........................... 396/6; 396/462; 396/493; 396/502
(58) Field of Search ........................... 396/6, 349, 462, 396/493, 495, 502

(56) References Cited

U.S. PATENT DOCUMENTS 2,113,319 A * 4/1938 Crumrine ................... 396/348
3,672,280 A   6/1972 Imura
4,595,269 A   6/1986 Wong
6,125,237 A   9/2000 Park
6,349,003 B1  2/2002 Ko

FOREIGN PATENT DOCUMENTS

JP          2-105127        4/1990

* cited by examiner

Primary Examiner—David M. Gray
(74) Attorney, Agent, or Firm—Robert Luke Walker

(57) ABSTRACT

A camera frame assembly has a frame that defines an optical axis. A shutter driver is mounted to the frame. The shutter driver selectively deflects from a charged state to a discharged state. A shutter is movable, relative to the frame, in directions parallel to the optical axis, between a inner position and an outer position. The shutter is pivotable about a pivot axis, relative to the frame, from a closed position to an open position by the deflecting of the shutter driver from the charged state to the discharged state. A shaft supports the shutter. The shaft is longitudinally aligned with the pivot axis. The shaft extends between the shutter and the frame.

16 Claims, 18 Drawing Sheets

CAMERA FRAME ASSEMBLY HAVING SHUTTER THAT SLIDES FORWARD AND BACK WITH ZOOM LENS

CROSS REFERENCE TO RELATED APPLICATIONS

Reference is made to commonly assigned, co-pending U.S. patent application Ser. No. 10/264,757, entitled: MULTIPLE POSITION LENS BARREL HAVING CAM CYLINDER WITH COMMONLY BIASED FIRST AND SECOND LENS CARRIERS, filed 4 Oct. 2002 in the name of Anthony Dirisio.

Reference is made to commonly assigned, co-pending U.S. patent application Ser. No. 10/324,966, entitled: CAMERA LENS MODULE HAVING RECYCLABLE LENS BARREL CAP, filed 20 Dec. 2002 in the name of Anthony Dirisio.

Reference is made to commonly assigned, co-pending U.S. patent application Ser. No. 10/327,503, entitled: EXTENDABLE LENS CAMERA HAVING MECHANICAL SHUTTER BLOCKING IN INTERMEDIATE LENS POSITIONS, filed 20 Dec. 2002 in the name of Anthony Dirisio.

Reference is made to commonly assigned, co-pending U.S. patent application Ser. No. 10/324,488, entitled: CAMERA FRAME ASSEMBLY HAVING FOUR-BAR LINKAGE SHUTTER ACTUATOR, filed 20 Dec. 2002 in the name of Anthony Dirisio, which is hereby incorporated herein by reference.

Reference is made to commonly assigned, co-pending U.S. patent application Ser. No. 10/325,553, entitled: CAMERA FRAME ASSEMBLY HAVING SHUTTER ACTUATOR WITH TELESCOPING STRIKER AND METHOD, filed Dec. 20, 2002 in the name of David J. Cornell, which is hereby incorporated herein by reference.

Reference is made to commonly assigned, co-pending U.S. patent application Ser. No. 10/326,450, entitled: CAMERA FRAME ASSEMBLY HAVING INDEPENDENTLY BACK-PIVOTING DRIVE HUB FOR IMPACT SHUTTER, filed 20 Dec. 2002 in the name of Anthony Dirisio, which is hereby incorporated herein by reference.

FIELD OF THE INVENTION

The invention relates to photography and cameras and more particularly relates to a camera frame assembly having a shutter that slides forward and back with a zoom lens.

BACKGROUND OF THE INVENTION

Many cameras, particularly one-time-use cameras, have single bladed impact shutters. This type of shutter has a shutter that pivots about a point offset from an exposure opening. The shutter has a first portion that covers an exposure aperture and a second portion, on the other side of the pivot point, that is struck to momentarily open the shutter. The shutter is biased closed by a biasing spring. The shutter, or a lever connected to the shutter, is struck by a fast moving lever, often referred to as a "high energy lever". Some other impact shutters operate in a similar manner, but have more than one blade.

Energy is typically supplied to a high energy lever by one or more springs that are biased (also referred to as "charged") by a film transport mechanism during the advancing of a film frame. After biasing, the high energy lever is latched by another part. The latching is released by the shutter release. The location and operation of a high energy lever in a camera are, thus, constrained by required interactions with other camera components. Many cameras have high energy levers that pivot a lever arm about a center point to impact the shutter. Others have a high energy lever that slides to translate a portion of the high energy lever against the shutter.

With simple cameras having fixed focus lenses, the separation between the shutter and the high energy lever can remain fixed. If the lens has a long focal length, then the high energy lever may be quite long. The shutter is near the lens at the forward end of a light baffle or lens barrel. The film transport is near the film near the opposite end of the baffle or barrel. The main portion of the high energy rotates or slides near the film transport mechanism and an arm or striker of the high energy lever extends forward to the shutter. If the baffle or barrel is long, then the arm is likewise long. U.S. Patent No. 4,595,269 and Japanese patent publication JP 2-105127, published Apr. 17, 1990, both disclose cameras having long high energy levers. In both cases, the high energy levers are also stepped one or more times. These kinds of long high energy lever arms have a risk of bending during use, particularly when used at a relatively high ambient temperatures. This degrades the accuracy of shutter speeds and exposure times and can degrade the quality of pictures taken.

U.S. Pat. No. 3,672,280 discloses a camera having a retractable lens barrel and a variable length operating mechanism for a shutter. In the camera, an elongate operation arm extends forward from an operation plate. A release lever has a belt crank shape having two oppositely directed legs. The release lever extends backwards toward the operation plate. One of the legs of the release lever contacts the operation arm and is moved along the operation arm when the lens barrel is retracted. When a shutter button on the camera is pressed, the operation plate and operation arm move (the operation plate is spring biased opposing this movement), operating the release lever. These features are biased in the opposite direction from the biasing of a shutter driver for an impact shutter.

It would therefore be desirable to have an improved camera in which an impact shutter can be moved forward and back relative to a camera frame and a shutter driver can be mounted on the frame.

SUMMARY OF THE INVENTION

The invention is defined by the claims. The invention, in broader aspects, provides a camera frame assembly having a frame that defines an optical axis. A shutter driver is mounted to the frame. The shutter driver selectively deflects from a charged state to a discharged state. A shutter is movable, relative to the frame, in directions parallel to the optical axis, between a inner position and an outer position. The shutter is pivotable about a pivot axis, relative to the frame, from a closed position to an open position by the deflecting of the shutter driver from the charged state to the discharged state. A shaft supports the shutter. The shaft is longitudinally aligned with the pivot axis. The shaft extends between the shutter and the frame.

It is an advantageous effect of the invention that an improved camera is provided in which an impact shutter can be moved forward and back relative to a camera frame and a shutter driver can be mounted on the frame.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
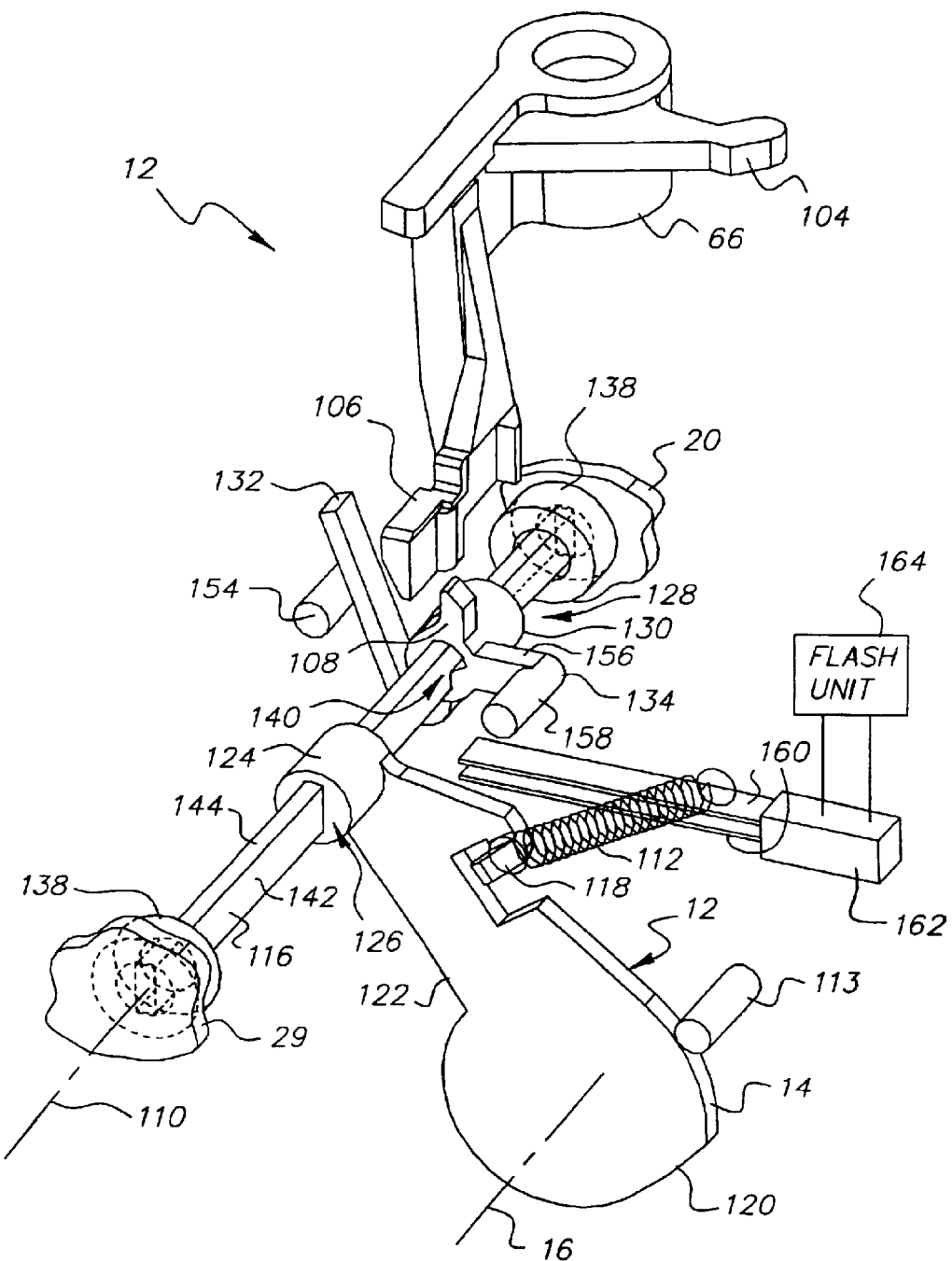
FIG. 1 is a front perspective view of the shutter mechanism and some other parts of an embodiment of the camera frame assembly. The shutter is in a rear position and charged state. A flash unit is indicated diagrammatically. Parts of the frame and lens shroud are shown.
Figure 2:
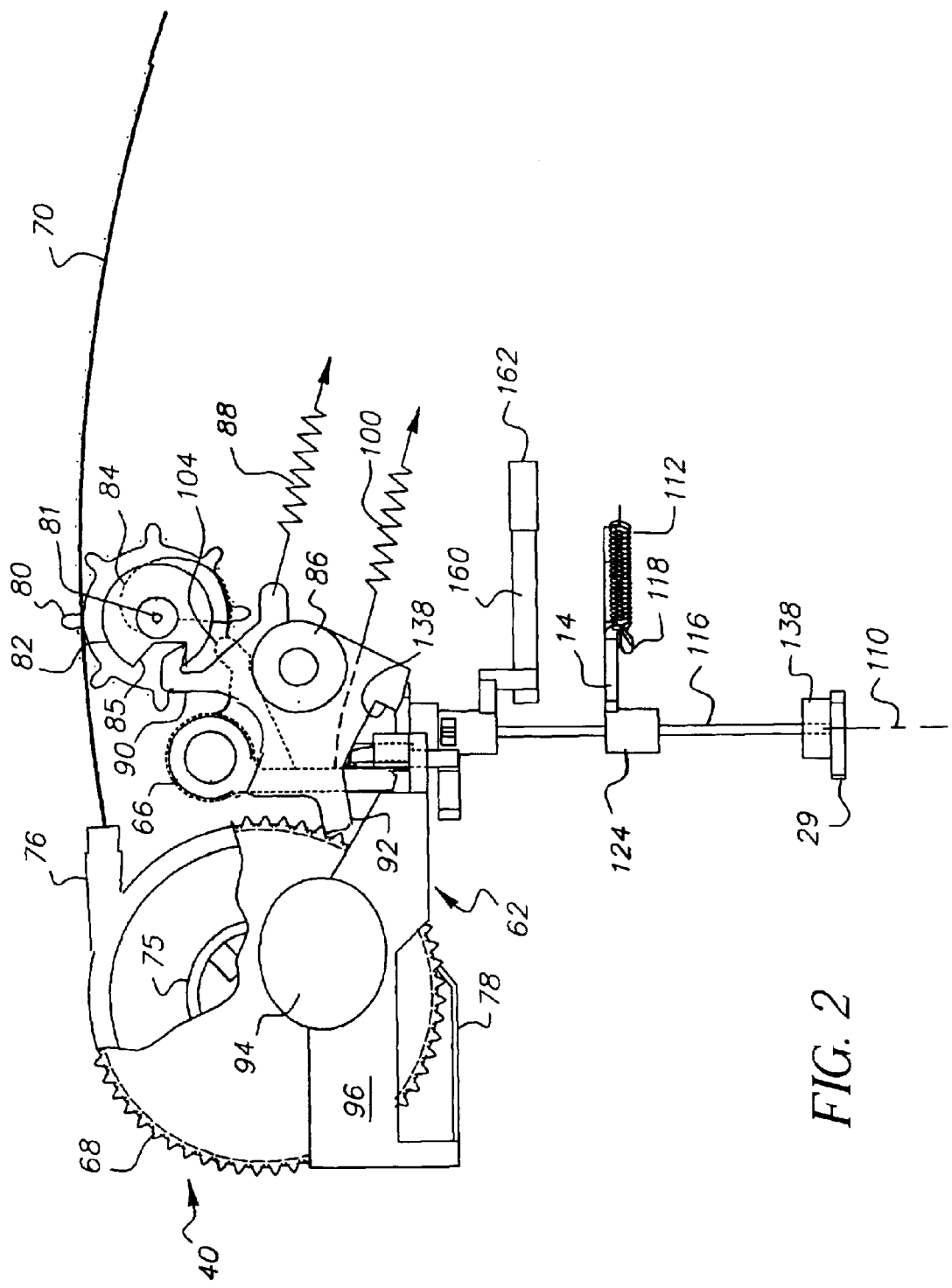
FIG. 2 is a top view of the shutter mechanism of FIG. 1. Also shown are the winding mechanism and a film cartridge. The thumbwheel is partially cut-away.
Figure 3:
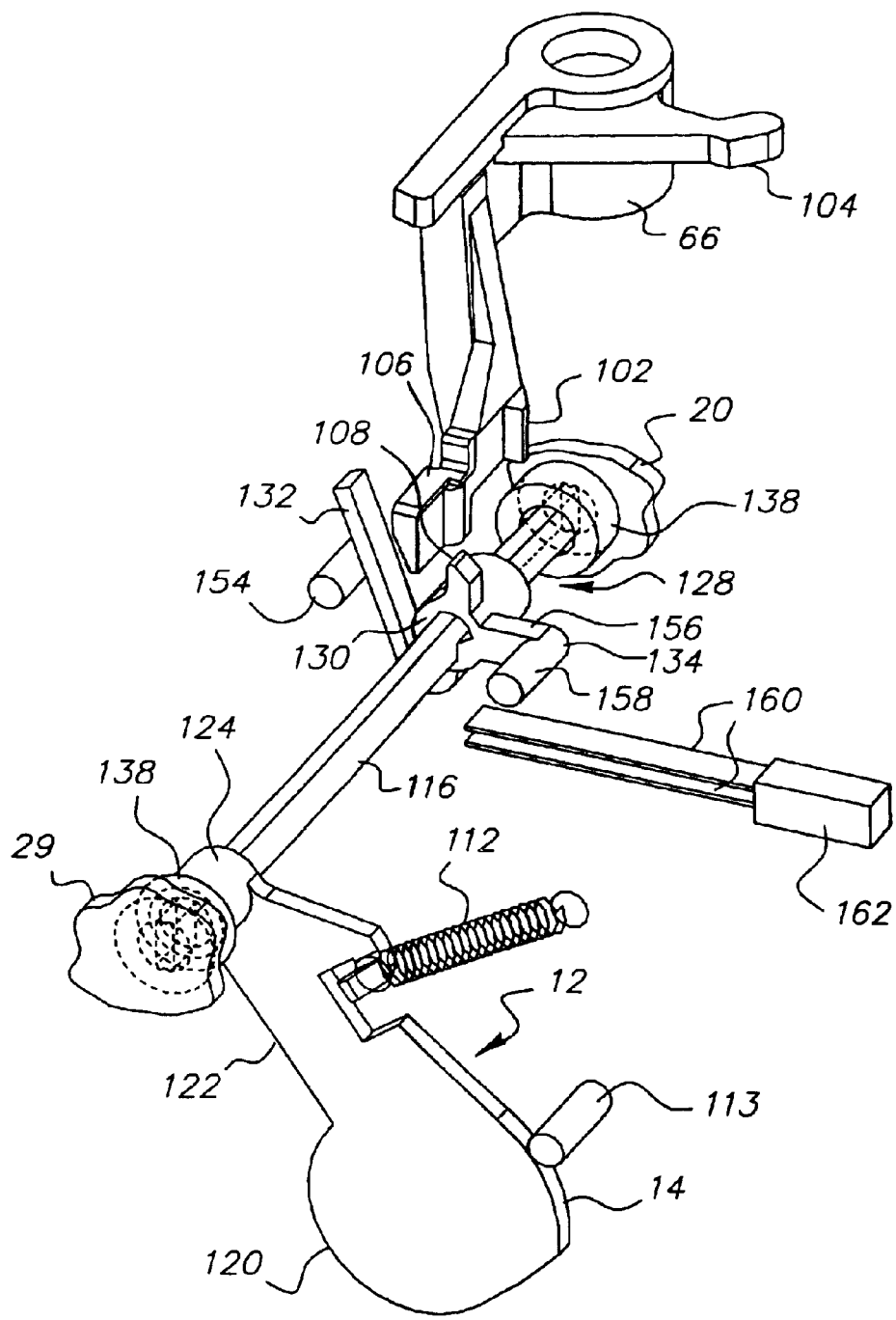
FIG. 3 is the same view as FIG. 1, but the shutter is in a front position and the flash unit is not shown.
Figure 4:
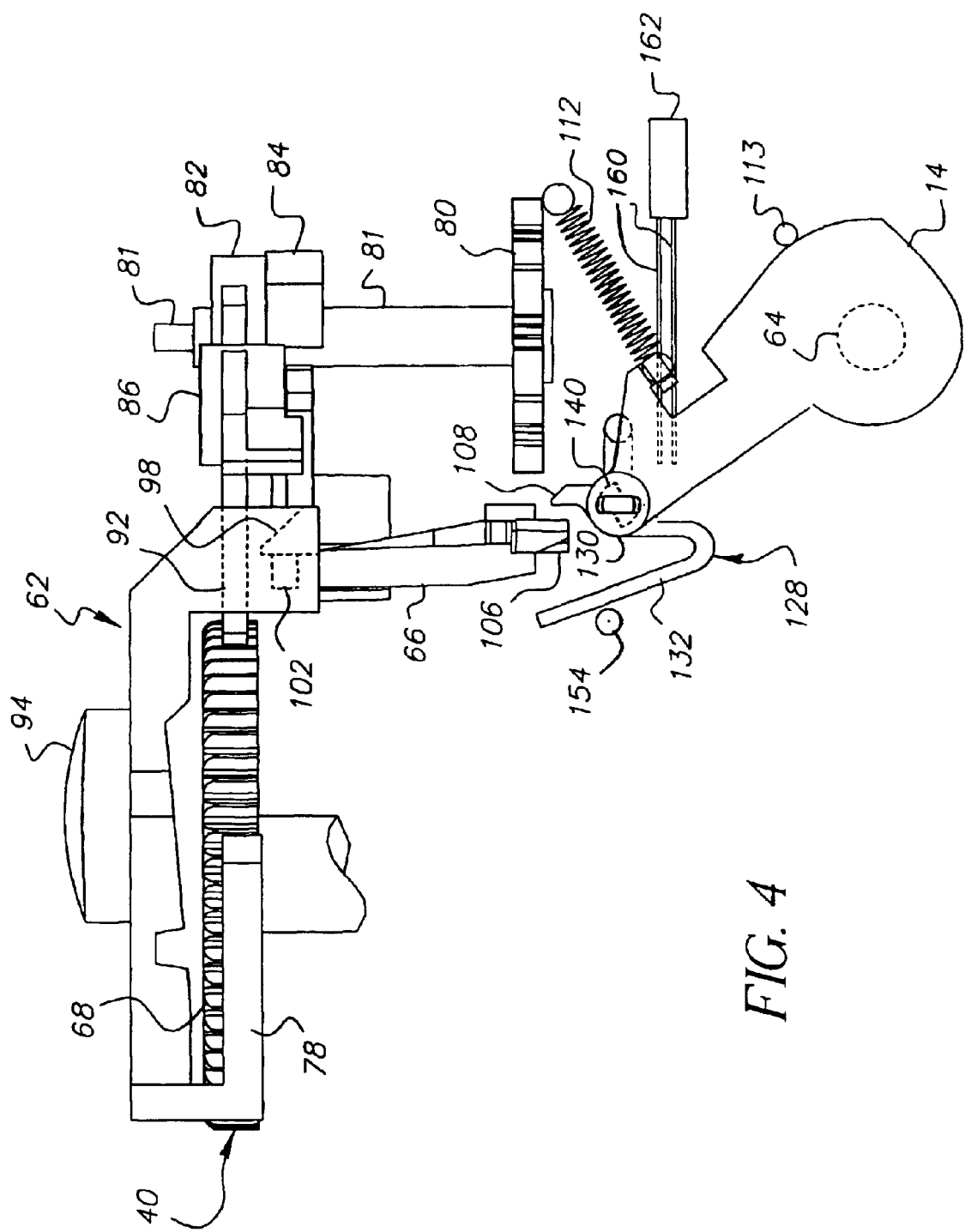
FIG. 4 is a front view of the shutter mechanism and winding mechanism of FIG. 2. The shutter mechanism is in a charged state.
Figure 5:
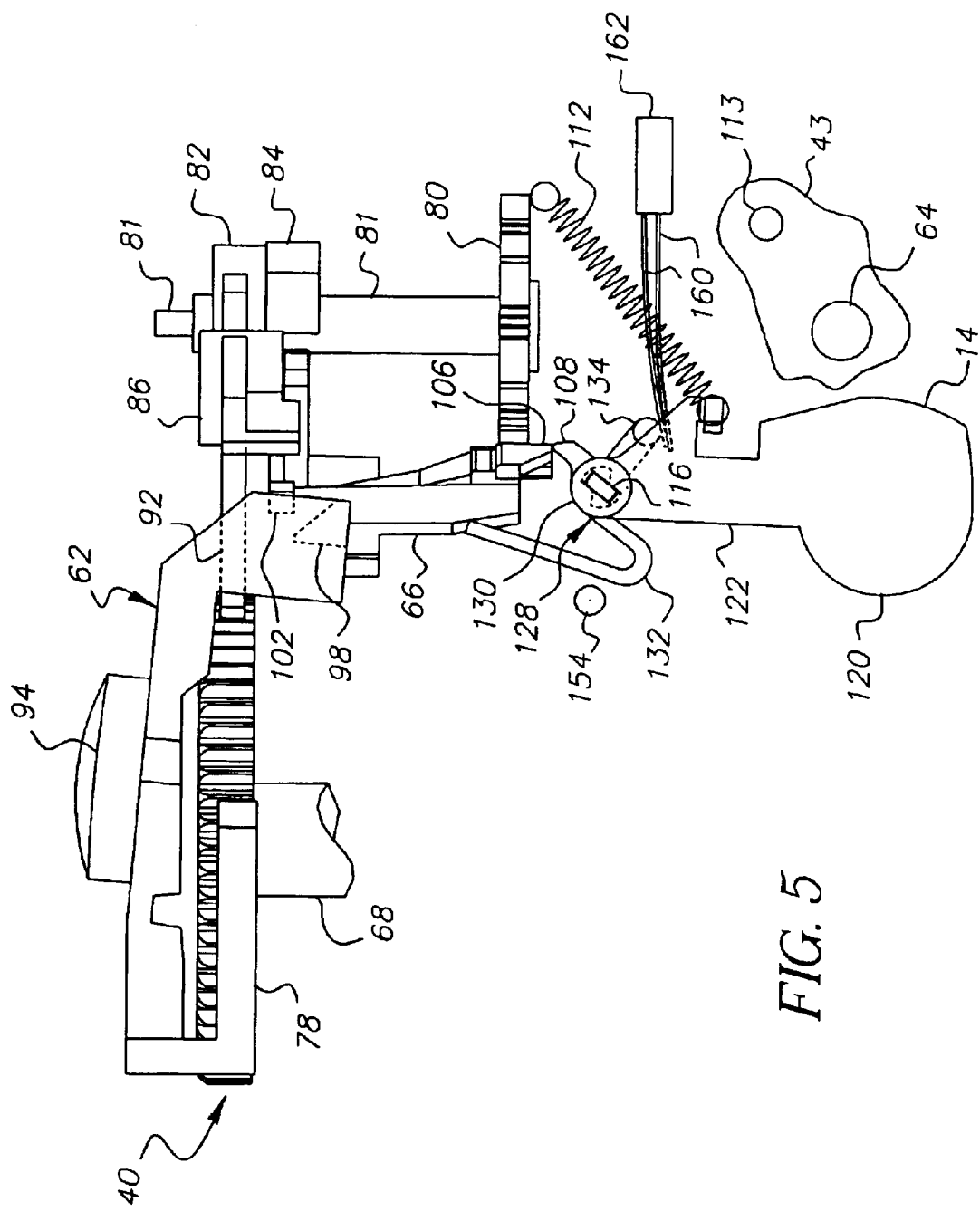
FIG. 5 is the same view as FIG. 3, but the shutter is in an opened state.

A camera frame assembly 10 includes a shutter mechanism 12 that has a shutter 14, which moves back and forth along an optical axis 16 with a lens barrel 18. The term "camera frame assembly 10" is used here to refer to a complete camera or an incomplete subunit of a camera that can be assembled with other parts to form a complete camera. The invention is particularly advantageous in relation to a camera frame assembly 10 that is a complete or incomplete one-time use camera.

Figure 7:
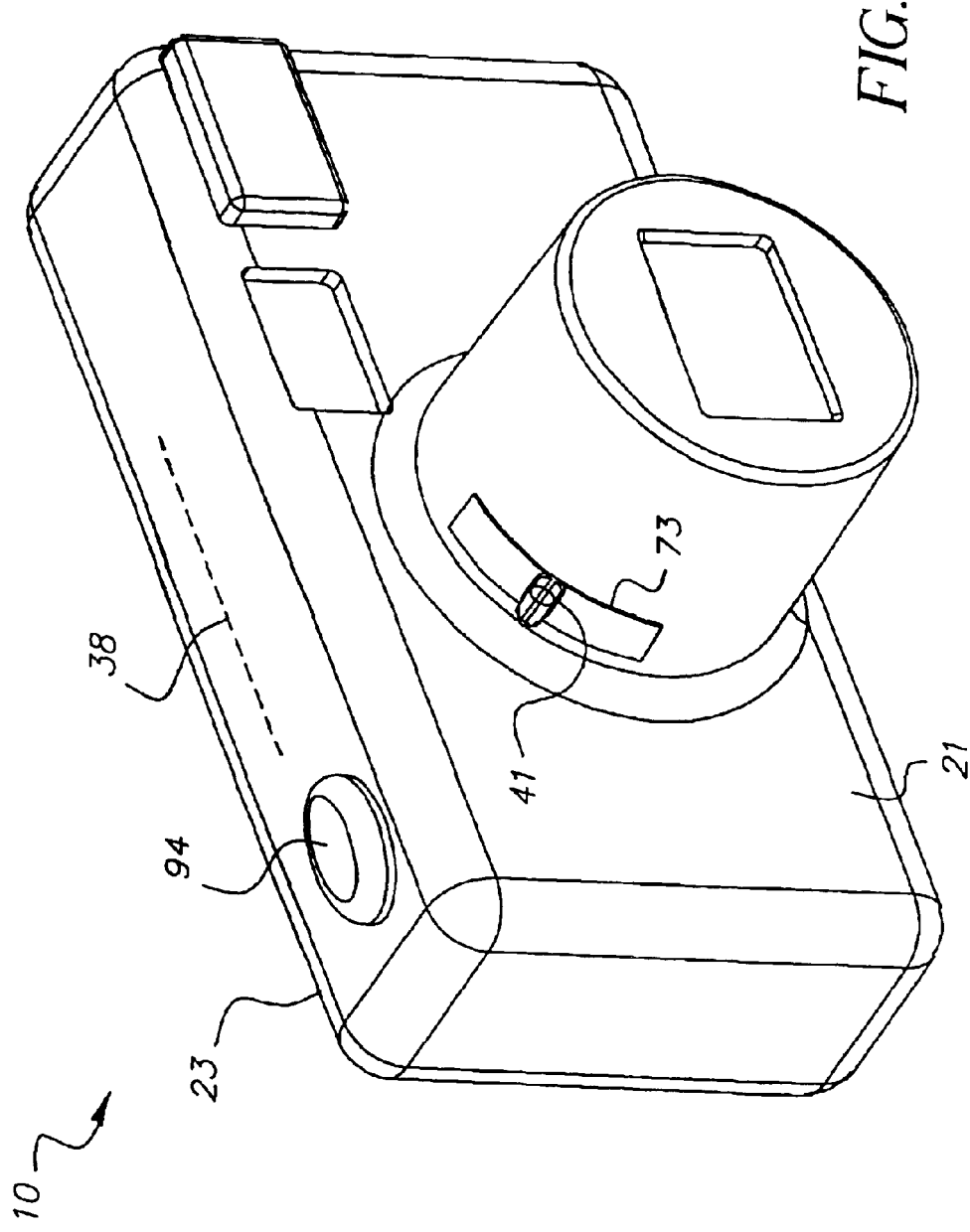
FIG. 7 is a front perspective view of the camera frame assembly of FIG. 1.
Figure 8:
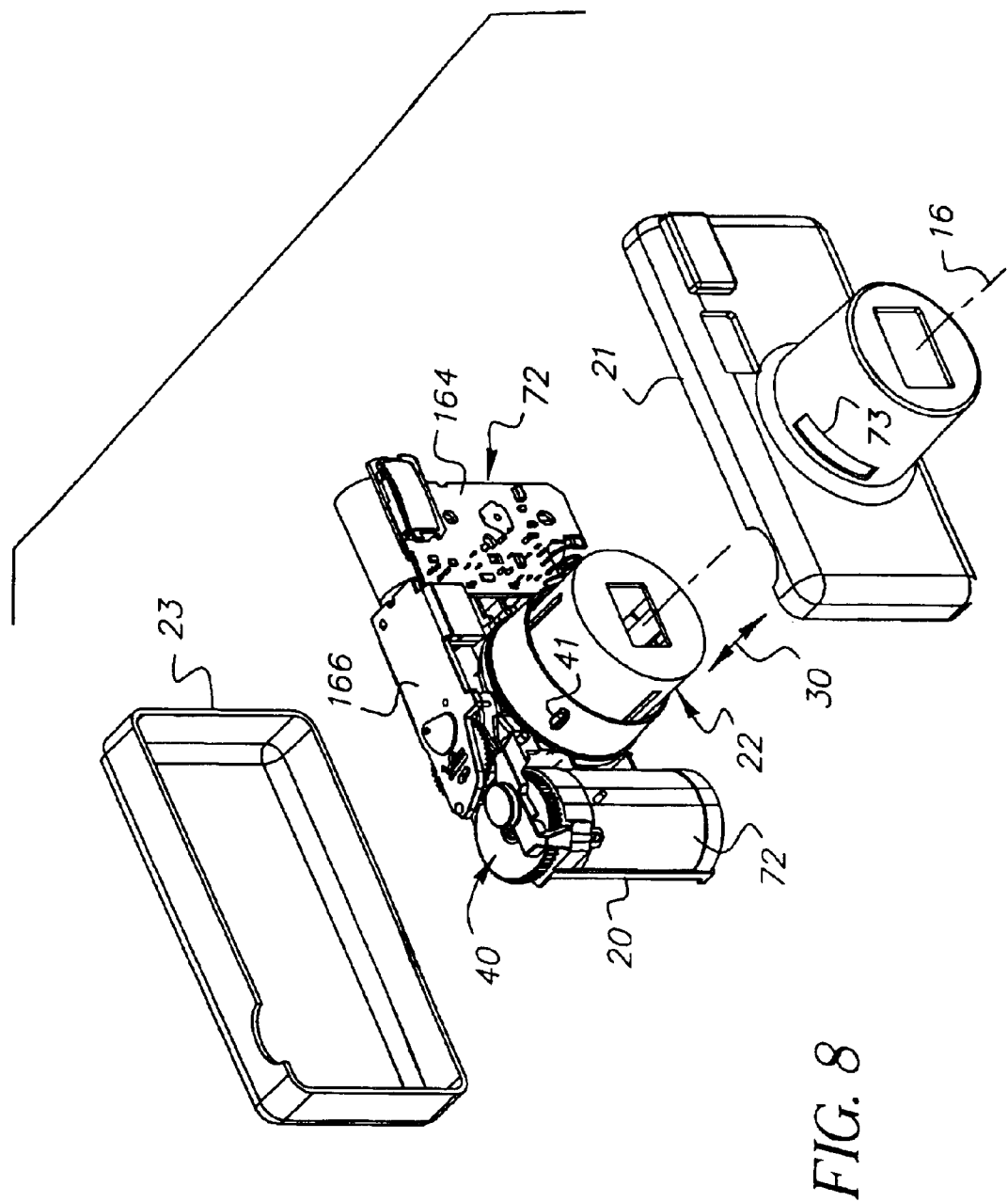
FIG. 8 is a partially exploded front perspective view of the camera of FIG. 7. For clarity, some parts associated with the frame are not shown.
Figure 9:
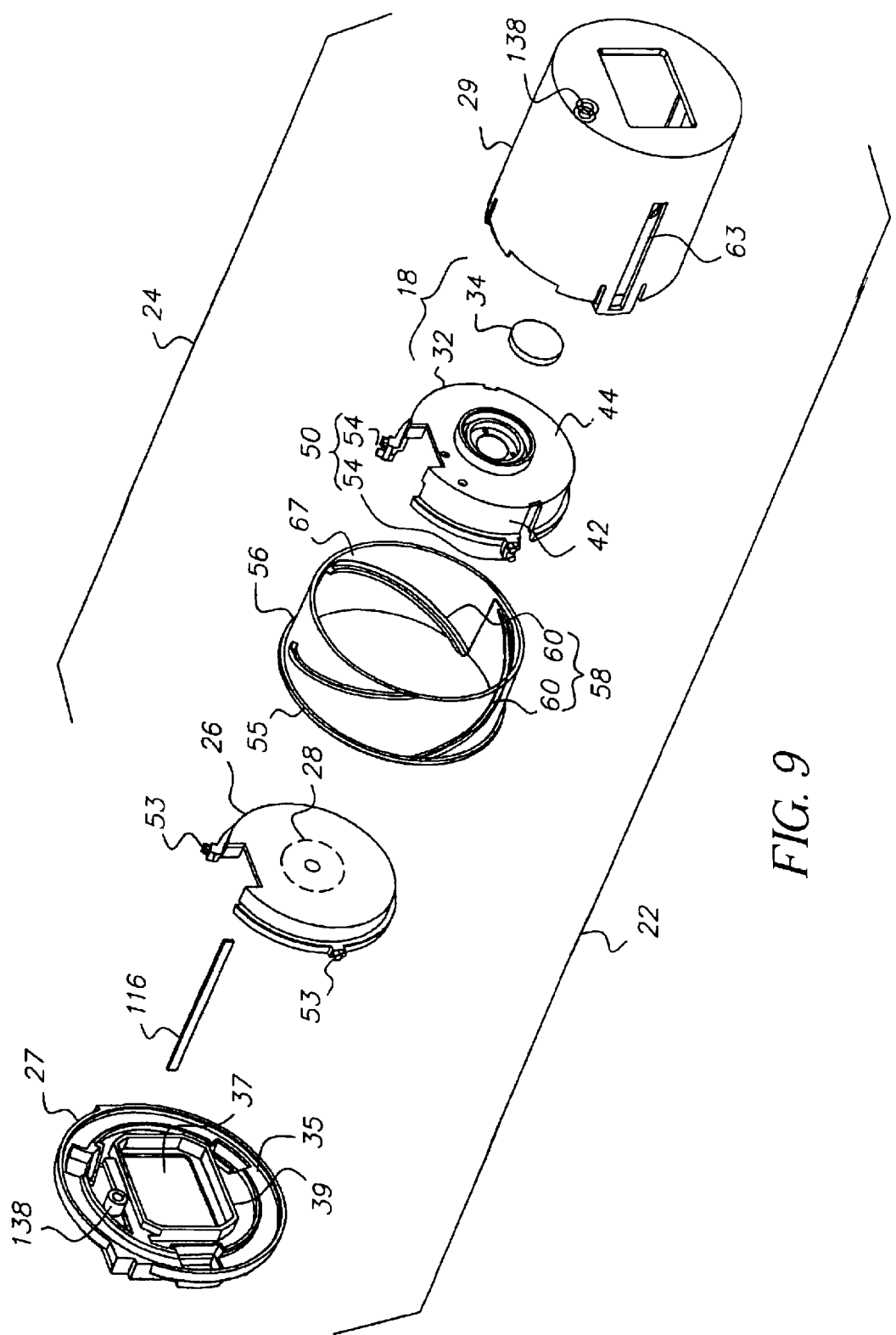
FIG. 9 is an exploded, front perspective view of the lens module of the camera of FIG. 7. The front lens retainer is not shown.

The camera frame assembly 10 has a frame or base member 20 and a lens module 22 attached to the base member 20. In the embodiments illustrated, the base member 20 is held between front and rear covers 21,23 of the camera frame assembly 10 and the lens module 22 extends through an opening in the front cover. Referring to FIG. 8, the base member 20 has a pair of opposed chambers 72, one can hold a film cartridge (not shown) and the other a film roll. A winding mechanism 40 advances film from the film roll, across a capture plane 38 (indicated by a dashed line in FIG. 7), and back into the film cartridge. A flash unit 164 can be included and synchronized with the shutter. A viewfinder-keeper plate 166 holds parts of the winding mechanism 40 on the frame. The flash unit 164 and other components are mounted to the base member 20 or held between the base member 20 and covers 21,23.

The lens module 22 has a lens base 24 that is mounted in a fixed position on the base member 20. (The term "fixed" and like terms are used herein in the sense of a physical position or relationship that is in immobile and unchanging.) The lens base 24 defines the optical axis 16. In particular embodiments of the invention, the lens base 24 includes a carrier 26 and a base lens element 28 (shown in FIG. 10) and optionally includes one or more additional lens elements (not shown).

In the embodiment shown in FIGS. 1–10, the lens base 24 includes the carrier 26, a mount 27, and a holder-cap 29. The mount 27 joins the lens module 22 to the frame 20 and is configured so meet the requirements of a particular frame design. The mount 27 is fixed to the frame 20. The manner in which the mount 27 and other parts are attached to the frame 20 is not critical. For example, the mount 27 can be attached by a friction fit or by hooks or can be otherwise fastened or adhered or bonded.

The mount 27 has a forward-facing cup 35 (see FIG. 9) that receives the holder-cap 29. A central opening 37 of the mount 27 can be bordered by a masking structure 39 that blocks unwanted light, so reducing flare. The holder-cap 29 is snapped, adhered, or otherwise fastened in fixed relation to the mount 27. The holder-cap 29 covers the lens barrel 18 such that the lens barrel 18 extends and retracts within the holder-cap 29. (See FIG. 9.) In this embodiment the front cover covers the base member 20 and the lens module 22, as shown in FIG. 7.

Figure 10:
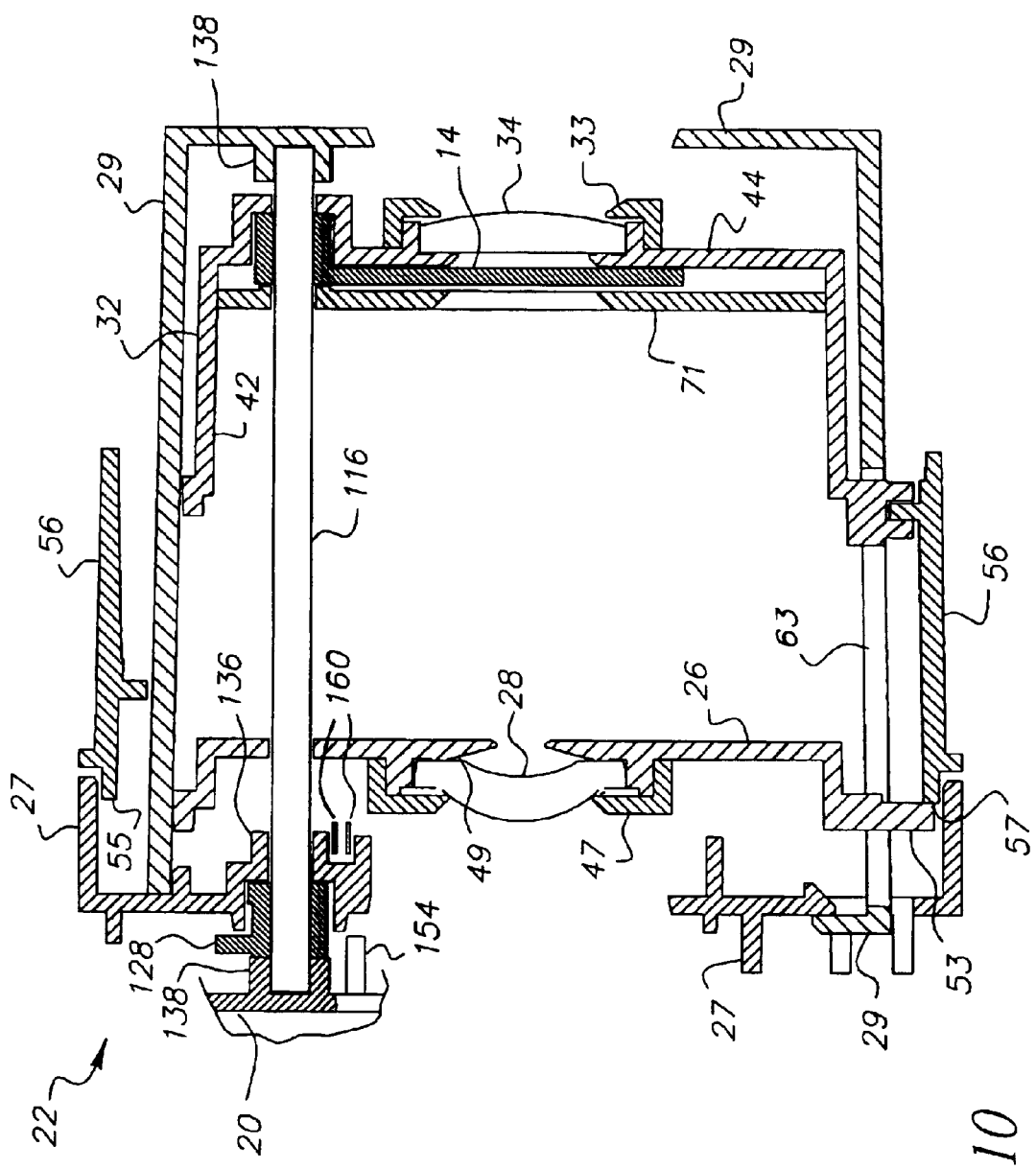
FIG. 10 is a cross-sectional view of the lens module and part of the frame of the camera of FIG. 7.
Figure 11:
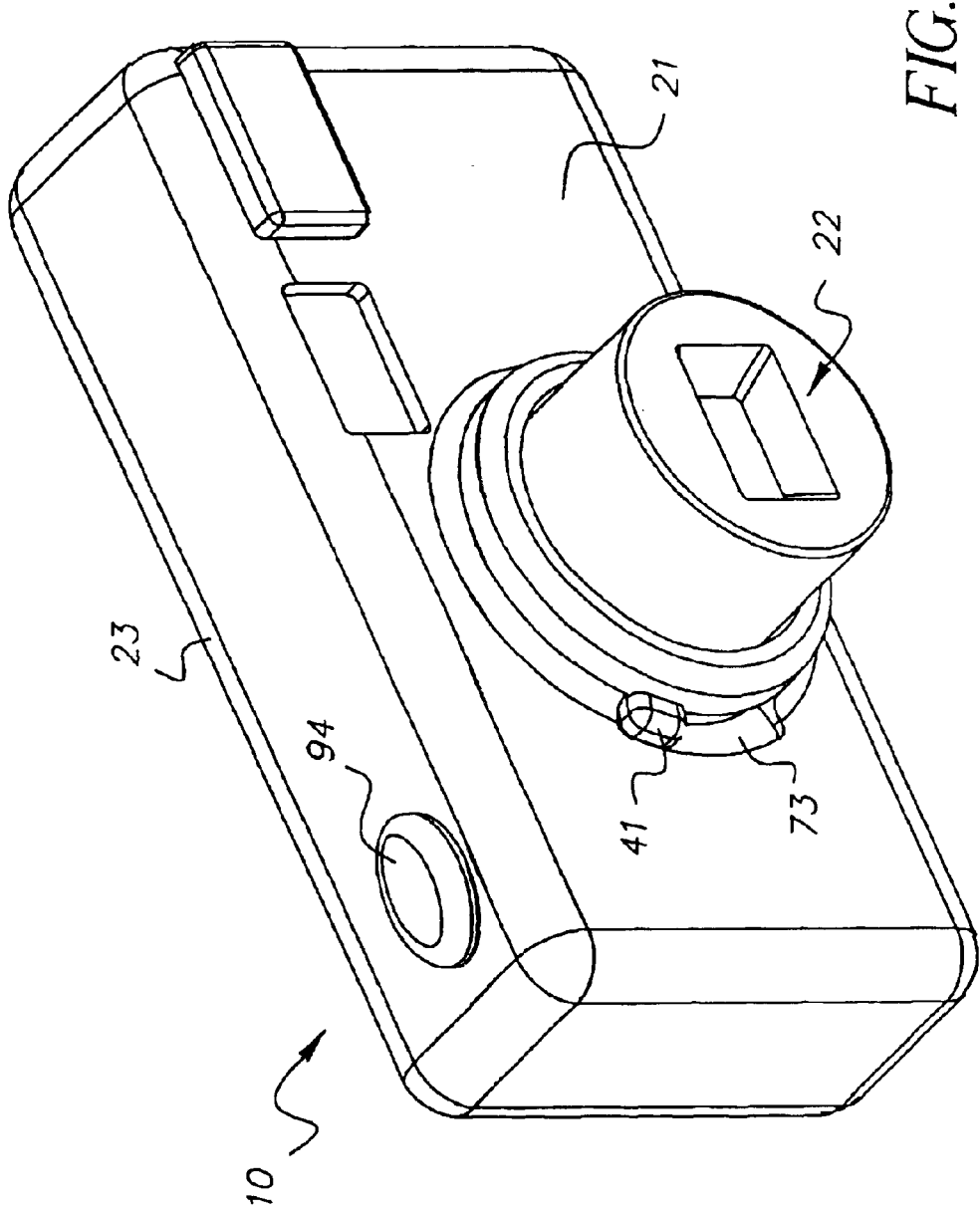
FIG. 11 is a front perspective view of another embodiment of the camera frame assembly.
Figure 12:
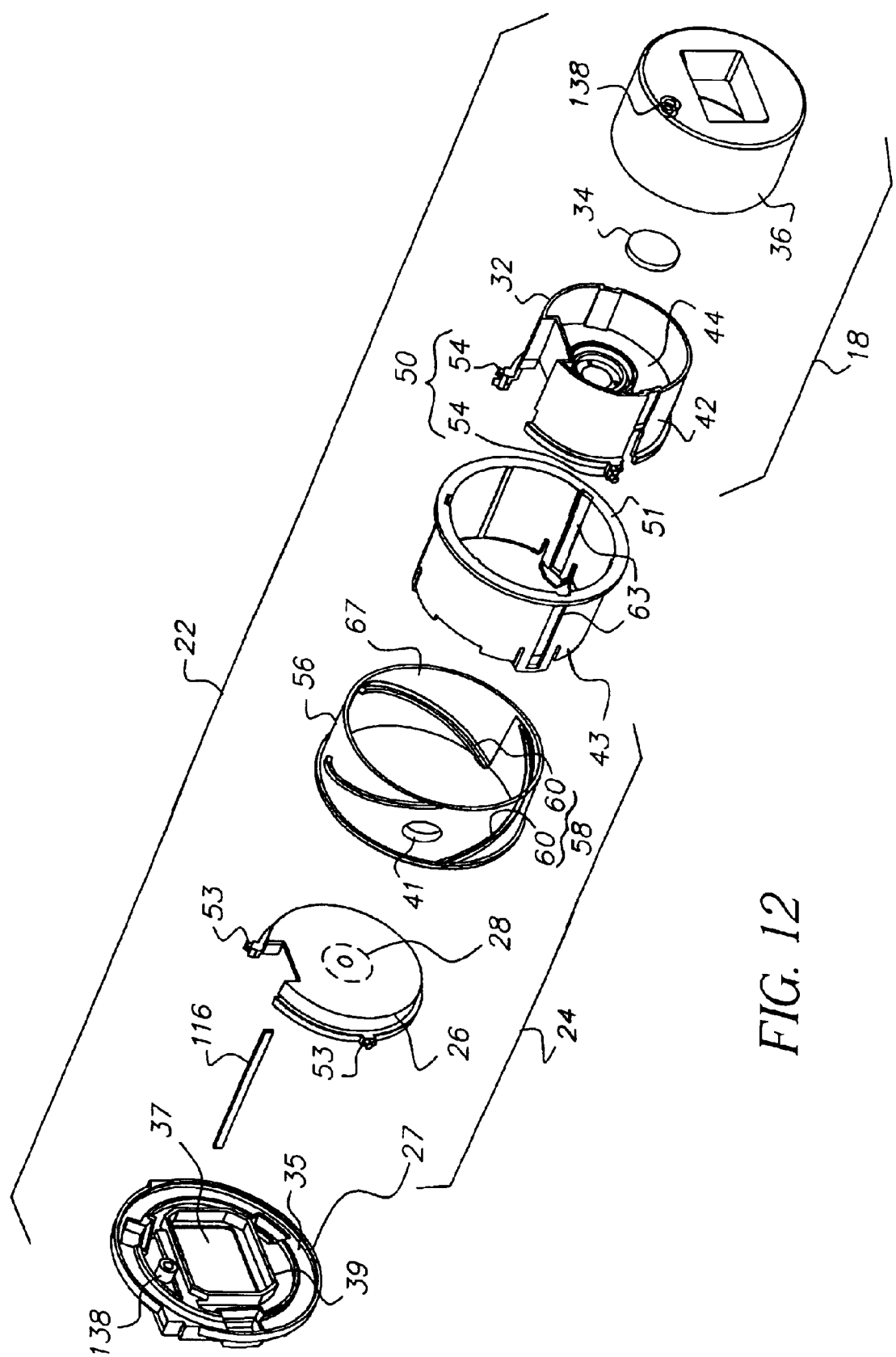
FIG. 12 is an exploded, front perspective view of the lens module of the camera of FIG. 11.

In an alternative embodiment, shown in FIGS. 11–12, the lens base 24 includes a holder 43 in place of the holder-cap 29. The holder 43 is similar to the rear portion of the holder-cap 29. The lens barrel 18 extends out of and retracts back into the holder 43. The end of the traveler 32 is covered by a separate cap 36, in this embodiment. The traveler 32 is lengthened relative to the traveler 32 of the embodiment of FIGS. 1–10.

The lens barrel 18 is joined to the lens base 24. The lens barrel 18 is movable forward and backward (indicated by double-headed arrow 30) along the optical axis 16 between a fully extended position and a fully retracted position. The movement of the lens barrel 18 may or may not include rotation about the optical axis 16.

The lens barrel 18 includes the traveler 32 and a front lens element 34 held by the traveler 32. The lens barrel can also include a front lens retainer 33 to hold the lens in place. In the embodiment shown in FIGS. 11–12, the lens barrel 18 includes a barrel cap 36 that replaces the lens retainer 33 and closes the forward end of the traveler 32. Optionally, one or more additional lens elements (not shown) are located within the traveler 32. The front and rear lens elements 34,26 and other lens elements (if any) together comprise a taking lens system that directs light to the capture plane 38. The cameras are described herein in relation to embodiments having photographic film as capture media. An electronic imager (not shown) can be substituted for the photographic film.

In the illustrated embodiments, the traveler 32 has a cylindrical outside wall 42 and a cross wall 44 extending in a direction perpendicular to the optical axis 16. The cross wall 44 has a central opening and supports a front lens element 34. The shutter 14 is trapped between the cross wall 44 and a backer 71 that is joined to the outside wall 42 of the traveler 32. The backer 71 can be press fit or adhered or attached by fasteners or the like.

A twist ring 56 is mounted on the lens base 24. The twist ring 56 extends at least part of the way around the lens base 24. The twist ring 56 is reversibly rotatable relative to the lens base 24 from a rightward configuration through a plurality of intermediate configurations to a leftward configuration. (As with other directional terms herein, the terms "rightward" and "leftward" are used in a relative sense and are not limiting.) The twist ring 56 is mechanically coupled to the traveler 32, such that rotation of the twist ring 56 between the rightward and leftward configurations moves to the lens barrel 18 between the first and second positions, respectively. The twist ring 56 is trapped in place axially by a taper or internal feature of the holder-cap 29 in the embodiment of FIGS. 1–10 and by a forward rim 51 of the holder 43, in the embodiment of FIGS. 11–12.

The traveler 32 includes a connector 50 that along with parts of the lens base 24 and twist ring 56 provides an extension-retraction mechanism. The connector 50 has three track followers 54. The track followers 54 can be equally spaced about the traveler 32 to help prevent the traveler 32 from canting relative to the lens base 24. Each track follower 54 has a pair of spaced apart posts. The twist ring 56 has an engagement portion 58 that receives the connector 50 of the traveler 32 and constrains of the traveler 32 such that the traveler 32 moves forward and backward along the optical axis 16 when the twist ring 56 is rotated between the rightward and leftward configurations. The engagement portion 58 is a set of internal tracks 60 that each receive one of the track followers 54 of the traveler 32. In the embodiments illustrated herein, the tracks 60 are spiral ribs that extend toward the optical axis from the circumferential wall 67 of the twist ring 56. The tracks 60 are gripped between the posts of the respective track followers 54. Alternatively, tracks 60 can be grooves or pairs of parallel fences that receive track followers 54 configured to ride in the grooves or between the fences.

The track followers 54 extend to the tracks 60 through corresponding slots 63 in the holder-cap 29 or holder 43 of the lens base 24. The slots 63 each extend parallel to the optical axis 16. In the illustrated embodiments, there are three slots 63 and three corresponding track followers 54.

The track followers 54 slide along the tracks 60 when the twist ring 56 is rotated. Since the track followers 54 are held by the slots 63 of the lens base 24, this results in the lens barrel 18 traversing linearly inward or outward along the optical axis 16. After movement, the traveler 32 is held in a selected position by friction.

The engagement portion 58 and corresponding connector 50 can also be changed. For example, the engagement portion 58 and connector 50 can be meshed gears or the equivalent. Other mechanisms for retracting and extending a lens barrel using a twist ring are known to those of skill in the art.

The lens barrel movement is manually powered by the user rotating the twist ring 56. Referring to FIG. 1, the twist ring 56 includes a knob 41 that protrudes through a slot 73 in the front cover 21. The knob 41 is moved by the user to rotate the twist ring 56. The lens barrel 14 can be operated manually in another manner and, alternatively, can be powered rather than being operated manually.

The carrier 26 has a base lens seat 49. The base lens element 28 is seated in the base lens seat 49 and is held in place by a retainer 47 that if pressed over the base lens seat 49. The base lens element 28 can, alternatively, be fastened or adhered in some other manner. The carrier 26 has pegs 53 that extend outward in the same manner as the track followers 54 of the traveler 32. The pegs 53 are trapped within respective slots 63 of the holder 43 rearward of respective track followers 54. Three pegs 53 are provided on the same basis as the three track followers 54 of the traveler 32.

The twist ring 56 has a rear margin 55 that is shaped into three cam surfaces 57 (a cam suds is shown in FIG. 10) that face respective pegs 53. When the twist ring 56 is rotated, the pegs 53 move against respective cam surfaces 57. The movement is constrained by the slots 63, such that the carrier 26 cannot rotate about the optical axis 16. The lens module can, optionally, bias the carrier against the cam surfaces or the traveler against the tracks, or both using springs or elastomer members (not shown).

The shutter mechanism 12 is opened to direct light through a taking lens system to the capture plane 38. The figures illustrate a photographic film type camera, but the camera can use an electronic imager rather than photographic film for archival capture of images.

The shutter mechanism 12 includes a shutter release 62 that is mounted to the frame 20 and an impact shutter 14 that is disposed in the traveler 32. The shutter 14 is generally described herein in terms of a single blade, but a system of multiple blades can be substituted for the single blade, if desired. The shutter 14 moves forward and back along the optical axis 16 with the traveler 32. The shutter 14 is normally in a closed state in which the shutter 14 tightly covers an aperture 64 in the cross wall 44 of the traveler 32. The shutter 14 is driven by a shutter driver 66 (sometimes referred to as a "high energy lever"). The shutter driver 66 is charged by the winding mechanism 40 to a charged state.

The winding mechanism 40 includes a combined thumbwheel and metering wheel 68 that is mounted for rotation adjacent a top corner of the frame 20. A portion of the wheel 68 extends beyond the rear cover 23 and is accessible to the camera operator. If desired, rather than being driven directly by the use, the wheel 68 can be driven by a winding knob, lever, electric motor or other like device.

Photographic film 70 is initially wound in a coil in one film chamber 72 and extends across the capture plane 38 to another film chamber 72, in which an end of the film is held by the spool 75 of a film cartridge 76. The wheel 68 has a key that couples the wheel 68 to the film cartridge spool 75, such that forward rotation of the wheel 68 causes the film to be wound into the cartridge 76 and advanced past the capture plane 38. An anti-backup pawl 78 is resiliently biased against an edge of the wheel 68 to prevent rotation in a reverse direction.

A film metering sprocket 80 has a sprocket shaft 81 that is pivotably supported by the frame 20. The sprocket 80 engages perforations in the film 70 and is rotated through a complete revolution each time the film 70 is advanced by a distance corresponding to one film frame.

An actuator disk 82 and a charging cam 84 are made in one piece with the sprocket 80 or are assembled with the sprocket 80 so as to remain in fixed (immobile) relation. The actuator disk 82 has a otherwise continuous circumference interrupted by a notch 85. The charging cam 84 has a spiral surface on one side and a spiral surface on the other side.

A film metering lever 86 is supported for pivotal movement by the frame 20. (The metering lever 86 and shutter driver 66 are illustrated as having empty, cylindrical cores that can receive upwardly extending posts provided on the frame 20. The metering lever 86 and shutter driver 66 can instead have shafts that fit in holes in the frame 20 and keeper plate 166.) The metering lever 86 is biased by a coil spring 88 in an activating direction. The metering lever 86 has a first arm 90 ending in a tooth and a second arm 92 having a pawl. When the toothed arm 90 of the metering lever 86 is received in the notch 85 of the actuator disk 82, the pawl arm 92 of the metering lever 86 engages the toothed rim of the wheel 68 temporarily blocking advancement of the film 70.

The shutter release member 62 includes a shutter button 94 that is located near the cantilevered end of a flexible arm 96 of the shutter release 62. Adjacent the shutter button 94 the arm 96 has a vertical tab that carries a latch member 98.

The shutter driver 66 is biased by a coil spring 100. The shutter driver 66 has a tongue 102 that is engaged by the latch member 98 to hold the shutter driver 66 in a charged position in opposition to the spring 100. The shutter driver 66 also has a cam follower finger 104 that is positioned so as to engage the charging cam 84.

Figure 14:
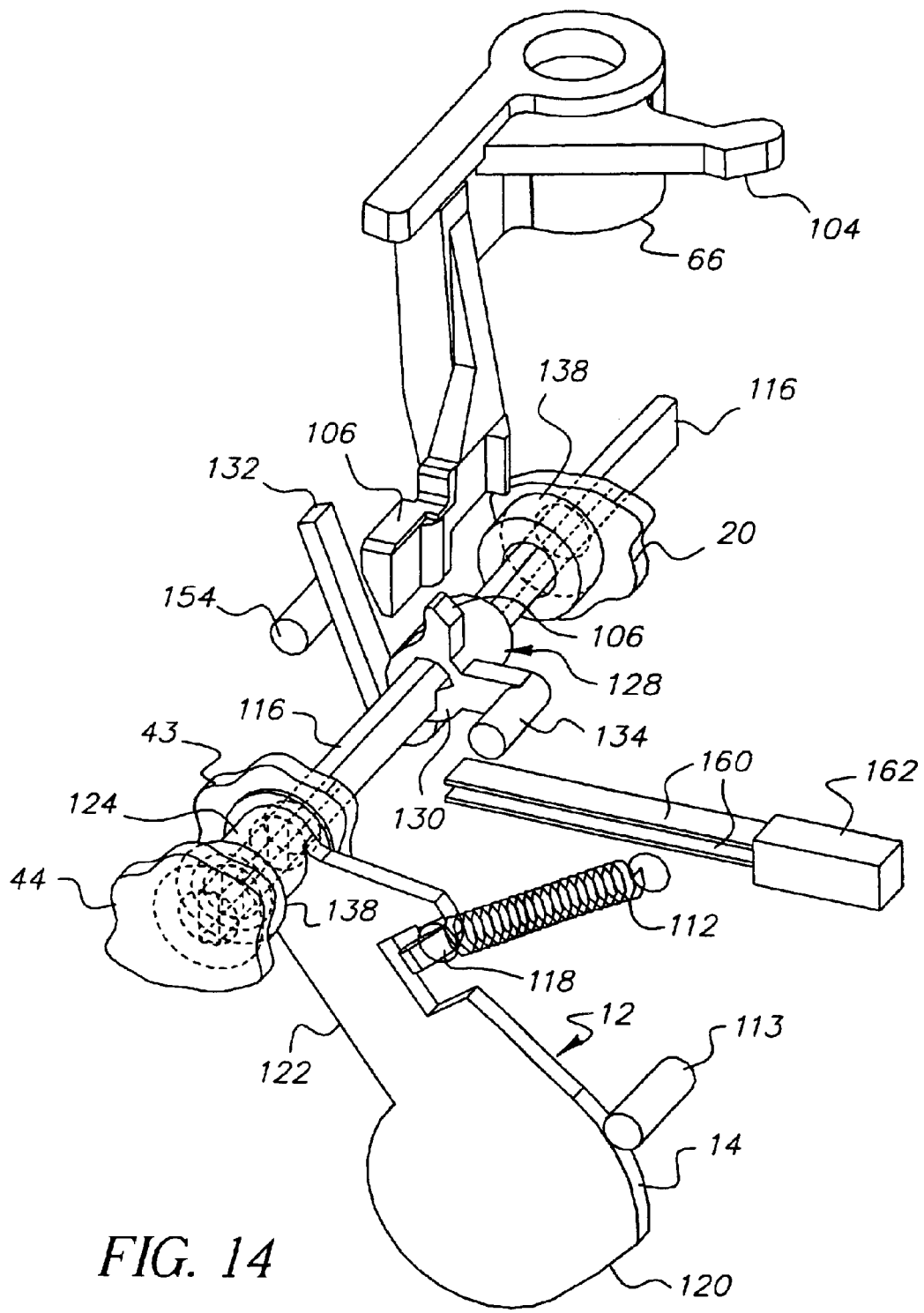
FIG. 14 is the same view as FIG. 1, of another modified shutter mechanism.

When the shutter driver 66 is in the charged state and the camera is in condition to make an exposure, as shown in FIG. 14, the tongue 102 of the shutter driver 66 is engaged by the latch member 98, which holds the shutter driver 66 in the charged condition in opposition to the spring 100. Prior to this during film advance, the sprocket 80 has been rotated into a position in which the toothed arm 90 of the metering lever 86 is in the notch 85 of the actuator disk 82. This allows the metering pawl arm 92 to engage the wheel 68 under the influence of the spring 100. The cam follower finger 104 of the shutter driver 66 is out of contact with the charging cam 84.

When the photographer depresses the shutter button 94 to initiate an exposure, the shutter release 62 is released from a ready state to a released state. The shutter button 94 moves the latch member 98 out of engagement with the tongue 102 of the shutter driver 66, the shutter driver 66 is pivoted rapidly by the spring 100 from the charged state to the discharged state. During this movement of the shutter driver 66, a protruding striker 106 of the shutter driver 66 impacts the tang 108, causing the shutter 14 to rotate about a pivot axis 110 from a closed state to an open state. This moves the shutter 14 away from the aperture 64 exposing a light image on the capture plane 38. The aperture 64 is uncovered momentarily. When the striker 106 moves past the tang 108, the shutter 14 returns to a closed state under the biasing of a shutter return spring 112. Movement of the the shutter 14 into the closed position is limited by a stop 113.

After the film exposure has been completed, the user releases the shutter button 94. The shutter driver 66 moves into engagement with a downwardly extending yoke 114 of the metering lever 86. This causes the metering lever 86 to rotate to a deactivated position, by overpowering the weaker force exerted on the metering member 86 by spring 88. Accordingly, the metering pawl arm 92 is disengaged from the wheel 68 and the metering member tooth arm 90 is retracted from the actuator disc notch 85. This allows the winding mechanism 40 to be operated to advance the film to the next available frame.

When the photographer next rotates the wheel 68 forward, the film is wound onto the spool. This causes the metering sprocket 80 to rotate in the same direction. The charging cam 84 engages the finger of the shutter driver 66 and rotates the latter back to a charged position.

A shaft 116 extends outward from the frame 20 to and, preferably, beyond the shutter 14. The shaft 116 is longitudinally aligned with the pivot axis 110 of the shutter 14 and is also parallel to the optical axis 16. Referring now to FIGS. 1–9, in a particular embodiment, the shaft 116 extends outward from the frame 20 and through the cross wall 44 of the traveler 32. In this embodiment, the shutter 14 has a blocking portion 120 that covers the aperture 64 when the shutter 14 is in a closed state. Joined to the blocking portion 120 is a neck 122 that includes an attachment 118 for the shutter return spring 112. The other end of the shutter return spring 112 is joined to an attachment (not shown) on the cross wall 44 of the traveler 32. Joined to the neck 122 of the shutter 14, opposite the blocking portion 120, is a slider 124 that can slide back and forth on the shaft 116. The sliding movement is unconstrained except by the movement of the traveler 32. The fit between and the slider 124 and the shaft 116 is a such that rotation of the shutter 14 relative to the shaft 116 is precluded. As a result, rotation of the shaft 116 causes the shutter 14 to likewise rotate.

The slider 124 can extend fully around the shaft 116, as shown in FIGS. 1–9. The shaft 116 extends through an keyway 126 in the slider 124. The slider 124 can have other forms. For example, the slider 124 can be a tongue (not shown) that fits through an elongated slot (not shown) in the shaft 116 and and slides back and forth within the slot. It is preferred that the fit between the slider and of the shaft 116 have close tolerances. This reduces the risk of vibration or other undesirable movement during opening and closing of the shutter 14.

Interior to the shutter 14, a drive hub 128 is mounted on the shaft 116. The drive hub 128 has a knuckle 130 through which the shaft 16 extends. Extending out from the knuckle 130 toward the shutter driver 66 is a tang 108. Extending outward in another direction from the knuckle 130 is an reset arm 132. Opposite the reset arm 132 is a switch actuator 134. The drive hub 128 is separate from the shutter 14. A retainer 136 (shown in FIG. 10) blocks movement of the drive hub 128 along the shaft 116 parallel to the pivot axis 110. In the illustrated embodiment, the retainer 136 is a portion of the lens base 24. Other forms of retainer 136 can be provided, such as a protrusion or part (not shown) fitted on the shaft 116 forward of the drive hub 128.

During picture taking and recharging, the tang 108 functions in the same manner as a tang 108 that is part of a single-blade impact shutter. That is, when the shutter driver 66 moves from the charged state to the discharged state, the striker 106 of the shutter driver 66 impacts against the tang 108 causing the drive hub 128 to rotate about the pivot axis 110. The tang 108 can have a portion cutaway to add clearance for movement of the striker 106 past the tang 108 during recharging.

In the invention herein, the drive hub 128 is spaced from the shutter 14 and acts on the shutter 14 only via of the shaft 116. When the tang 108 is rotated by the shutter driver 66, the shaft 116 rotates about the pivot axis 110. This causes the shutter 14 to rotate and moves the shutter 14 from the closed state to the open state. The shutter return spring 112 is biased by the movement of the shutter 14 from the closed state to the open state. After the striker 106 of the shutter driver 66 has cleared the tang 108, the shutter return spring 112 causes the shutter 14 to return to the dosed state.

The shaft 116 pivots in a pair of bushings 138. One of the bushings 138 is provided in the frame 20. The opposite bushing 138 is provided in the holder-cap 29 (see FIG. 9) or the cap 36 (see FIG. 12) or in the cross wall 44 of the traveler 32 (not shown). The shaft 116 extends through a passage 140 in the knuckle 130 of the drive hub 128. The passage 140 is oversized and provides for movement of the shaft 116 with the drive hub 128 during discharge of the shutter mechanism 12, when the tang 108 is struck by the striker 106 of the shutter driver 66. The passage 140 also allows for movement of the drive hub 128 independent of the shaft 116 during recharging, when the shutter driver 66 is returned to the charged state. In the illustrated embodiment, the shaft 116 is roughly rectangular in cross-section. The larger sides 142 of the shaft 116 are flat and the narrower sides 144 have slight convex curvature. The passage 140 of the knuckle 130 is roughly butterfly shaped in cross-section. Opposed end walls 146 of the passage 140 are concave and match the narrower sides of the shaft 116. A pair of sidewalls 148 extend between the end walls 146. Each sidewall 148 has two pivot stops 150,152 arranged in a V-shape. One pair of pivot stops 150 contacts the wider sides 142 of the shaft 116 when the shaft 116 is rotated during picture taking. The other pair of pivot stops 152 approaches or contacts the wider sides 142 of the shaft 116 during recharging (Pivoting of the drive hub 128 during recharging is limited by the resilient bending of the reset arm 132.)

Figure 6:
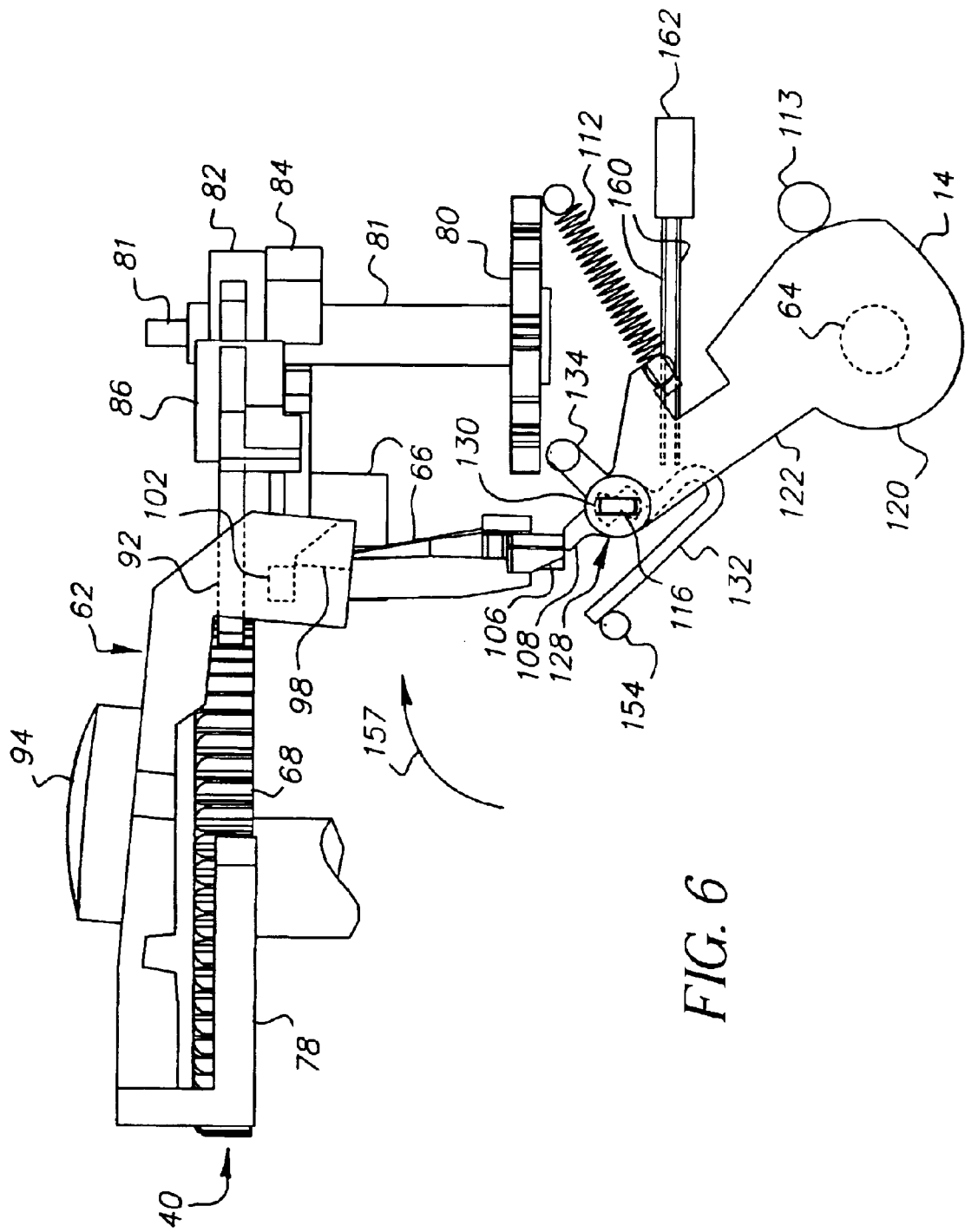
FIG. 6 is the same view as FIG. 3, but the shutter mechanism is transitioning to a recharged state.

The reset arm 132 faces a limit stop 154 that extends out from the frame 20. The reset arm 132 is spaced from the stop 154 except during recharging. At that time, as shown in FIG. 6, the reset arm 132 presses against the stop 154. The reset arm 132 is resilient. During recharging, when the striker 106 clears the tang 108, the reset arm 132 propels the drive hub 128 in the direction of arrow 157. This pivots the drive hub 128 relative to the shaft 116, from a recharging position in which the first wider side 142 of the shaft 116 presses against the first pair of pivot stops 150 of the knuckle 130 passage 140 to a ready position in which the second wider side 142 of the shaft 116 presses against the second pair of pivot stops 152. This is done to provide a quicker response of the drive hub 128 to the striking movement of the shutter driver 66, during shutter mechanism 12 discharge. Resilience of the reset arm 132 can be provided in any convenient manner. In the illustrated embodiment, the reset arm 132 is a piece of curved plastic that bends resiliently during use.

The actuator arm 134 has a neck 156 extending outward from the knuckle 130 and a head 158 joined to the neck 156. Adjoining the head 158 area pair of contacts 160 of a synchronization switch 162. When the drive hub 128 pivots during discharge and the shutter 14 opens, the head 158 moves against the contacts 160 and presses the contacts 160 together. This provides a signal to a flash unit 164 that then fires a strobe tube (not separately illustrated). Suitable flash units for this purpose are well-known to those of skill in the art. The return of the shutter 14 to the closed position under the impetus of the return spring 112 moves of the head 158 of the actuator arm 134 away from the contacts 160, reopening the sychronization switch 162.

As the shutter 14 opens during picture taking, a twisting force is applied to the shaft 116. Flexure of of the shaft 116 as a result of this twisting force, can result in a lag in the opening of the shutter 14. This is particularly problematic if the flexure and lag show large changes when the temperature of the camera changes during ordinary use, since the relative timing of shutter 14 opening and the closing of the sychronization switch also changes. For this reason, it is preferred that the shaft 116 does not flex during picture taking under ordinary environmental temperatures of 0 degrees to 100 degrees F. (For this purpose, a shaft 116 is considered to not flex if flexure of the shaft 116 during discharge is less than the clearance between the shutter 14 and the shaft 116.) In a particular embodiment, the shaft 116 is made of stainless steel or another material of the same stiffness. Soft steel and other soft metals are not preferred, since those materials have a risk of deforming during use.

In the embodiments just described, the shutter 14 slides on the shaft 116 and pivots with the shaft 116. An advantage of this embodiment is that the position of the shaft 116 relative to the frame 20 does not change when the traveler 32 is moved. Due to this, the pivot axis 110 of the shutter 14 has a fixed relationship to the frame 20. As a result, inaccuracies in the movement of the traveler 32 relative to the optical axis 16 are not transferred to the pivot axis 110 of the shutter 14.

Figure 13:
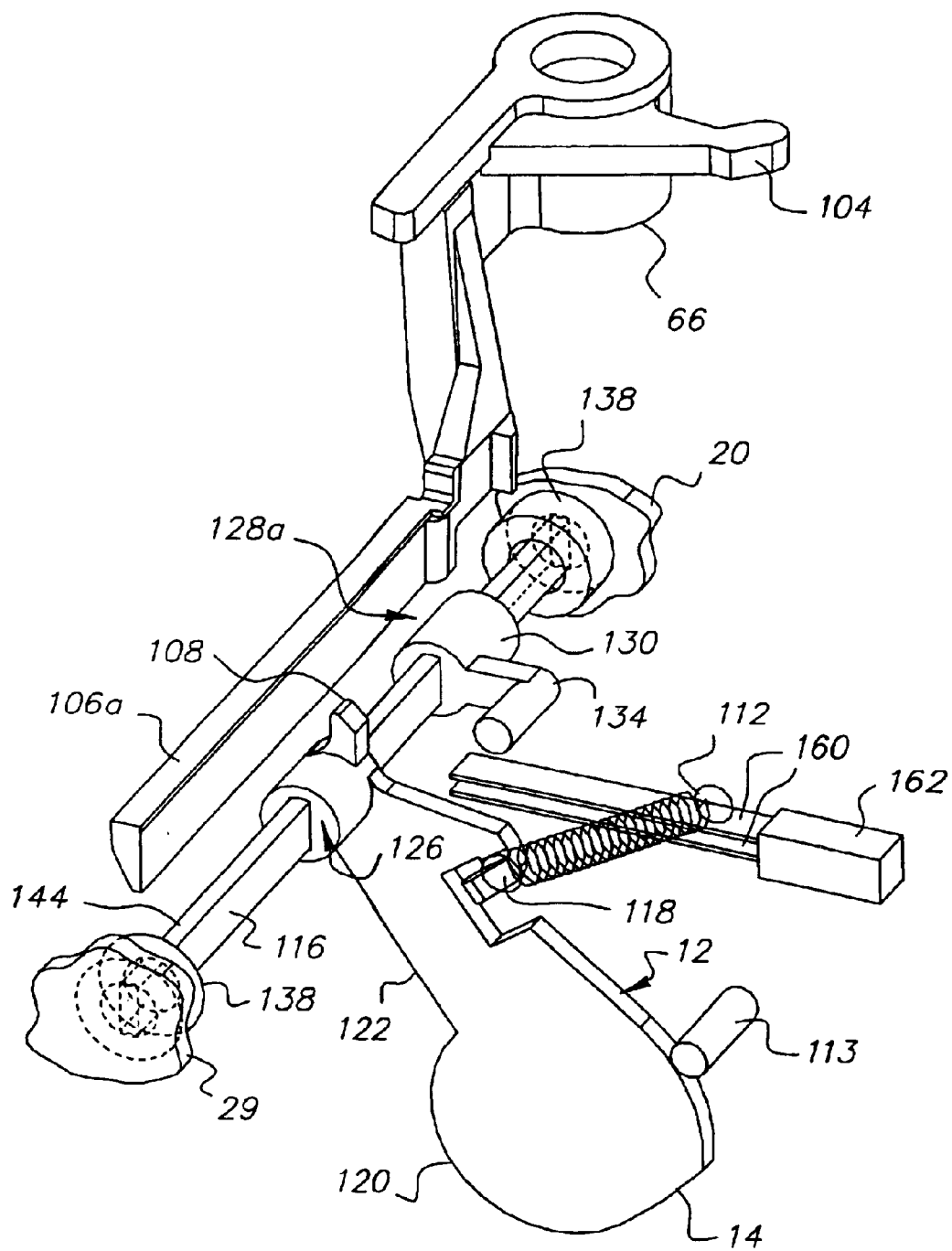
FIG. 13 is the same view as FIG. 1, of a modified shutter mechanism.

Referring now to FIG. 13, in another embodiment of the invention, the shutter 14a slides on the shaft 116, but, in this case, the tang 108a is part of the shutter 14a rather than the drive hub 128a and the striker 106a of the shutter driver 66a is lengthened to accommodate the movement of the tang 108a. The drive hub 128a does not move axially and the passage 140 can be simplified to match the shape of the keyway 126. The drive hub 128a otherwise functions as earlier described. This approach has the advantages earlier mentioned that the position of the shaft 116 relative to the frame 20 does not change when the traveler 32 is moved and the shaft 116 can act as a guide for the traveler 32 during movement of traveler 32. On the other hand, the striker 106a must be lengthened to reach the tang 108a and space is needed within the traveler 32 for movement of the striker 106a. There is also a risk that the long striker 106a will bend during picture taking, resulting in lag problems similar to those earlier discussed. A solution to this problem is the use of a striker 106a that is resistant to bending. For example, the striker 106a shown in FIG. 11 can be modified by use of a stiffening member (not shown) such as a length of stainless steel strip.

This last embodiment can be modified by making the passage in the slider of the shutter circular in cross-section (not illustrated). In that case, the tang is again part of the shutter rather than the drive hub, but the drive hub is otherwise like the drive hub of FIG. 1. This approach is not preferred, because the shutter blade is less constrained than in the embodiment of FIG. 1 and there is an increased risk of the shutter tilting and allowing light leakage.

Referring now to FIG. 14, in another embodiment of the invention, the shutter 14b is fixed in position on the shaft 116b and does not move axially back and forth relative to shaft 116b. The manner of attachment is not critical. The shutter 14b can be adhered in place or held by a fastener or, as illustrated in FIG. 11, press fit. In this case, as the traveler 32 is moved back and forth along the optical axis 16, the shutter 14b and shaft 116b both move with the traveler 32. The bushings 138 in the face of the frame 20 and the cross wall 44 of the traveler 32 support pivoting movement and axial movement of the shaft 116b. The shaft 116b can be longer than those earlier described, to allow the shaft 116b to move with the traveler 32, while still remaining in both bushings 138. The drive hub 128 does not differ from the drive hub 128 described in relation to the embodiment of FIG. 1. This embodiment has the advantage, like the embodiment of FIG. 1, that the position of the tang 108 does not change when the traveler 32 is moved along the optical axis 16. The on the other hand, the shaft 116b is not a fixed guide for the movement of the traveler 32 and space must be provided in the frame 20 and traveler 32 to accommodate the axial movement of the shaft 116b. There may also be an increased risk of the shutter tilting.

Figure 16:
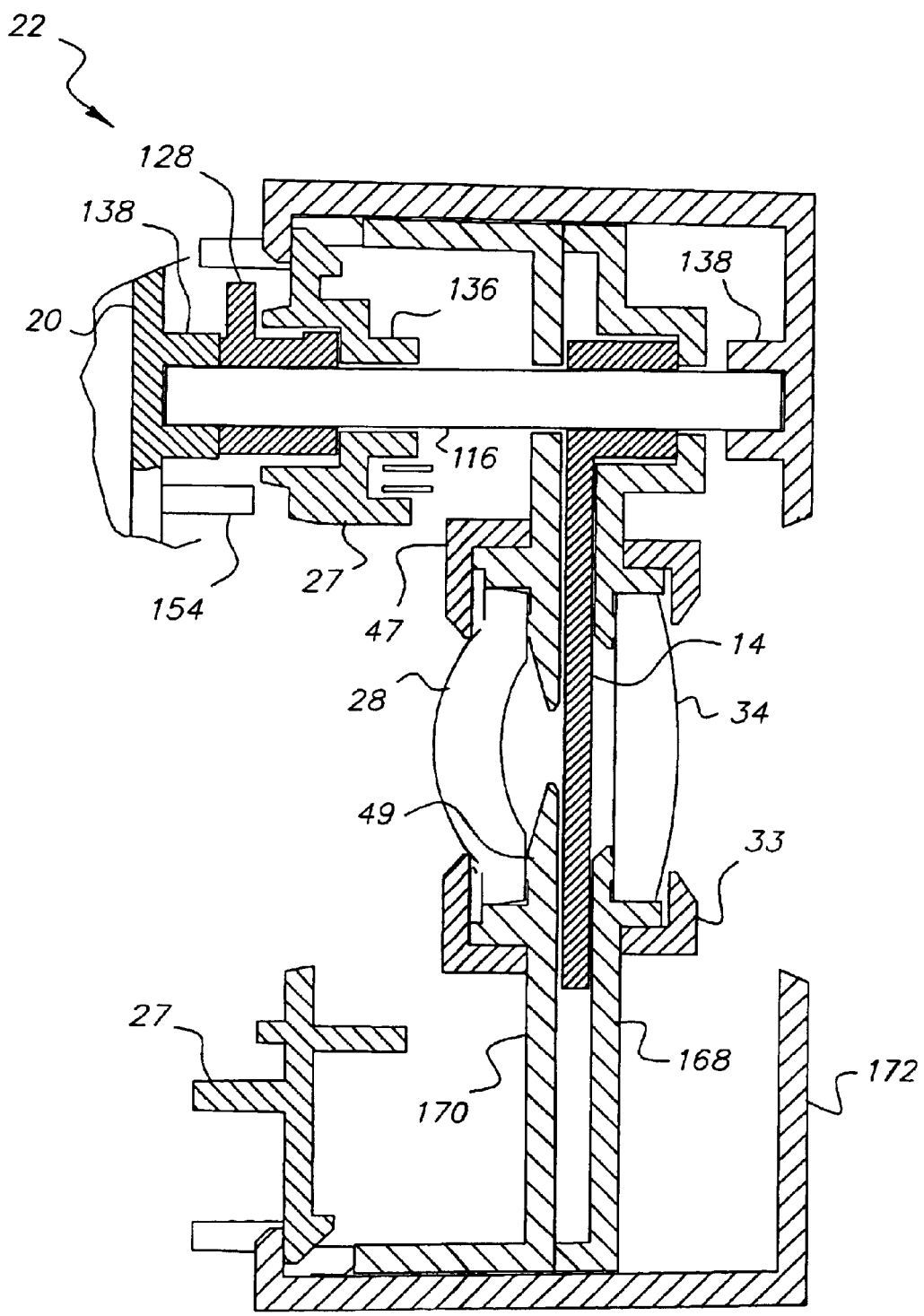
FIG. 16 is a cross-section of another embodiment of the camera frame assembly.
Figure 17:
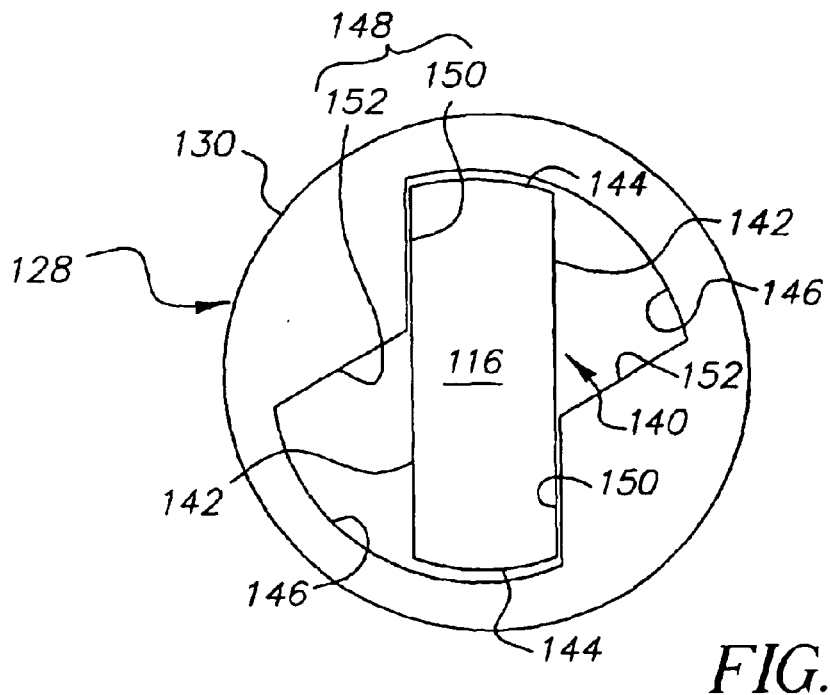
FIGS. 17–18 are front views of the drive hub and shaft of an embodiment of the camera frame assembly.
Figure 18:
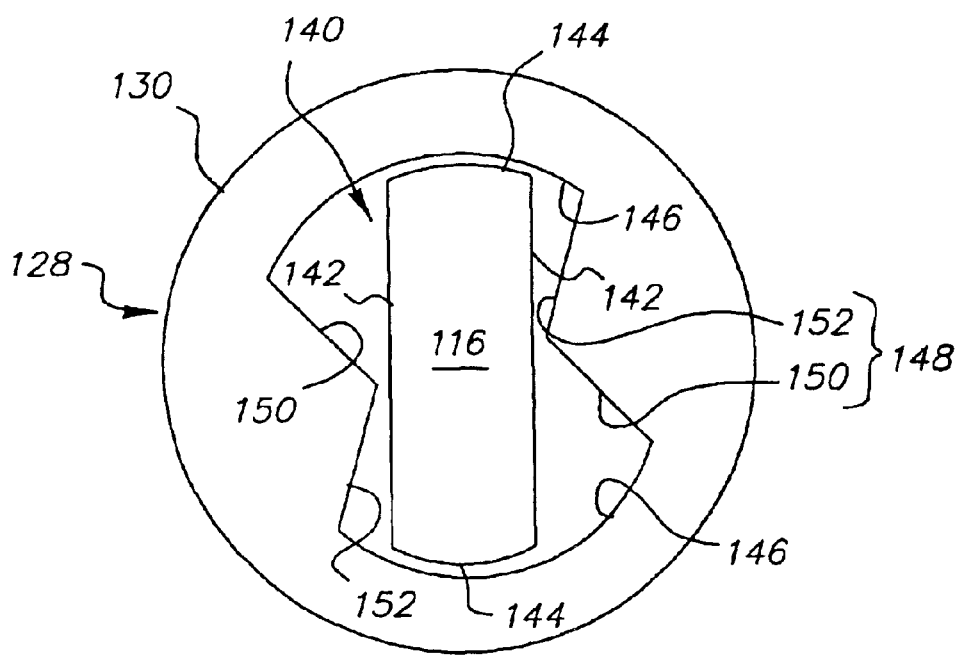

The drive hub 128 can be used with in a camera having a shutter that has a fixed position and does not extend and retract with a lens barrel. FIG. 16 shows a modification of the lens module 22 of FIGS. 1–10, in which the traveler and carrier are replaced by a first and second lens supports 168,170, respectively. The twist ring is eliminated. An end cap 172 fits over the first and second lens supports 168,170 and is hooked onto the mount 27. The first and second lens supports 168,170 are fixed in place, relative to the mount and each other, by friction fit or adhesive or fasteners or the like. The shutter mechanism is as in the embodiment of FIG. 1, but the shaft 116 is shortened and the shutter 14 is not free to move along the shaft 116.

Figure 15:
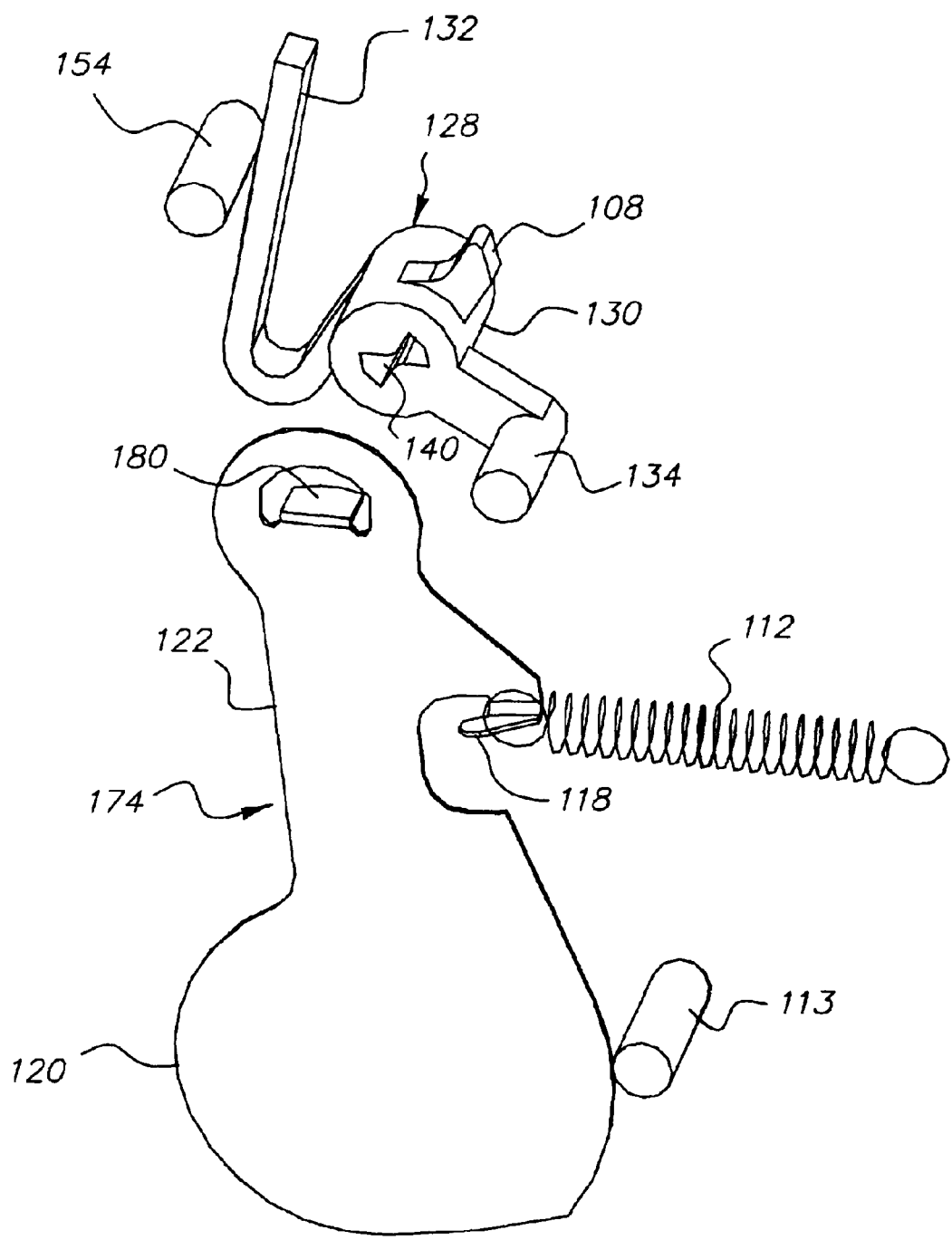
FIG. 15 is a front perspective view of the shutter blade, return spring and drive hub of still another modified shutter mechanism.
Figure 19:
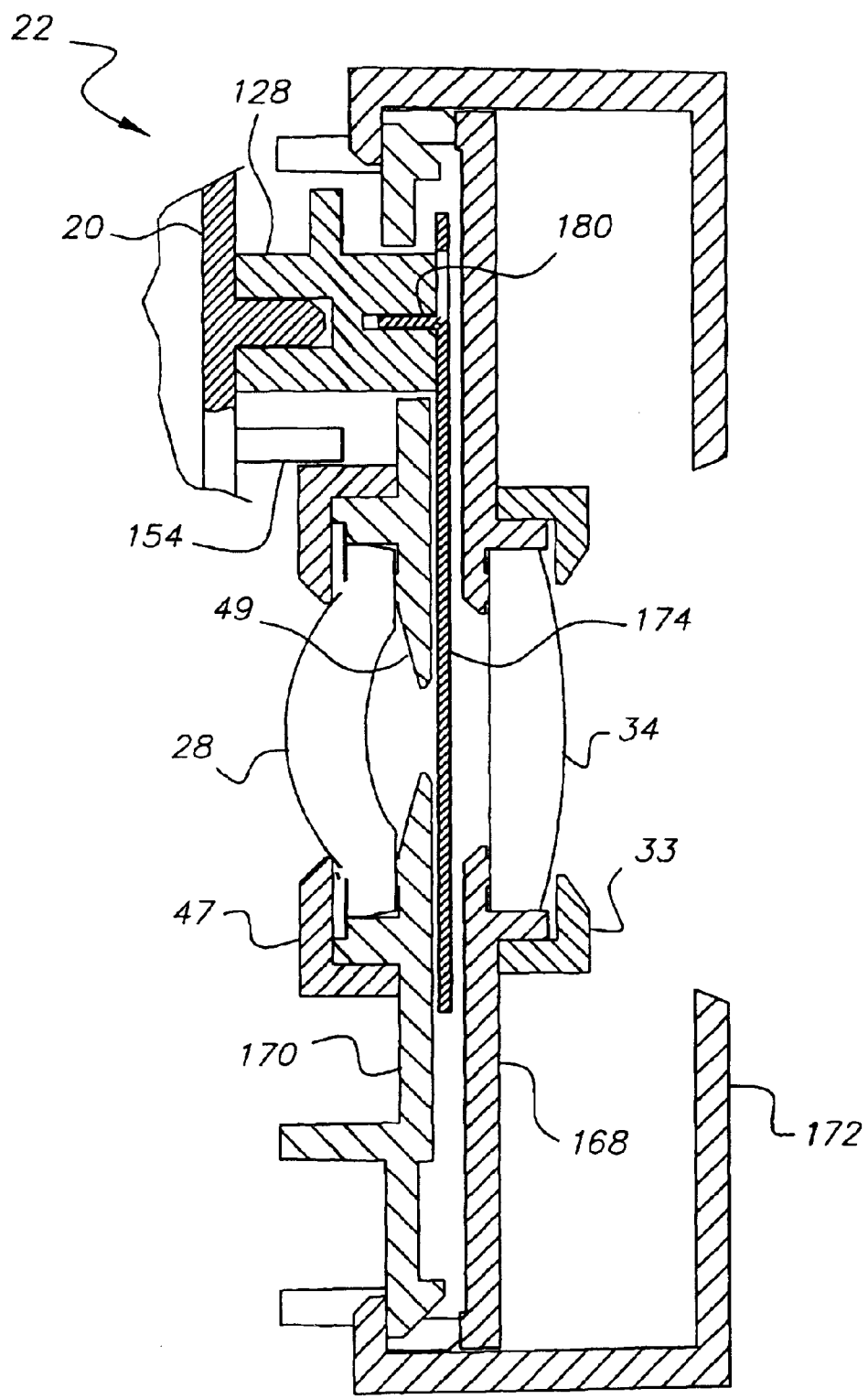
FIG. 19 is a cross-section of another embodiment of the camera frame assembly.

FIGS. 15 and 19 illustrate another embodiment, in which a one-piece shutter-shaft 174 replaces the shutter and the shaft The shutter-shaft 174 is biased by a spring 112 and has an attachment point 118, a blocking portion 120, and a neck 122 as in the earlier discussed shutter. The shaft 180 is a rearwardly extending protrusion formed with the neck 122 and blocking portion 120. For example, the shutter-shaft can be a stamped metal part. The shutter-shaft 174 is used in a modification of the lens module of FIG. 16. The drive hub 128 rides on a post of the frame 20, but is otherwise like the drive hub 128 of FIG. 1. The module is foreshortened and the second lens support 170 is aligned with the drive hub 128.

The invention has been described in detail with particular reference to certain preferred embodiments thereof, but it will be understood that variations and modifications can be effected within the spirit and scope of the invention. Feature of the invention can be modified, for example, in accordance with the disclosures of one or more of the patent applications earlier incorporated by reference herein.

What is claimed is:

1. A camera frame assembly comprising:
   a frame defining an optical axis;
   a shutter driver mounted to said frame, said shutter driver selectively deflecting from a charged state to a discharged state;
   a shutter movable, relative to said frame, in directions parallel to said optical axis, between a inner position and an outer position, said shutter being pivotable about a pivot axis, relative to said frame, from a closed position to an open position by said deflecting of said shutter driver from said charged state to said discharged state;
   a shaft supporting said shutter, said shaft being longitudinally aligned with said pivot axis, said shaft extending between said shutter and said frame;
   wherein said shutter is slidable along said shaft relative to said frame, between said inner position and said outer position.

2. The camera of claim 1 wherein said shutter and said shaft are pivotable together about said pivot axis, relative to said frame, from said closed position of said shutter to said open position of said shutter.

3. The camera of claim 2 further comprising a drive hub mounted on said shaft, and wherein said shutter is slidable along said shaft relative to said drive hub, said drive hub is directly contacted by said shutter driver during said deflecting, and said shutter, said shaft, and said drive hub are pivotable together about said pivot axis, relative to said frame, from said closed position of said shutter to said open position of said shutter.

4. The camera of claim 1 wherein said shutter is pivotable about said pivot axis, relative to said mount, independent of said shaft.

5. The camera of claim 1 further comprising a traveler movable relative to said frame between an extended position and a retracted position, and wherein said shaft extends forward from said frame to said traveler.

6. The camera of claim 4 wherein said shutter is internal to and movable with said traveler.

7. The camera of claim 1 further comprising a drive hub directly contacted by said shutter driver during said deflecting, said drive hub being pivotable about said pivot axis with said shutter.

8. The camera of claim 1 wherein said shutter is immobilized on said shaft and wherein said shutter and said shaft are slidable together relative to said frame.

9. The camera of claim 1 wherein said shutter is slidable along said shaft relative to said frame, between said inner position and said outer position and said shutter is pivotable about said shaft.

10. A camera frame assembly comprising:
    a frame defining an optical axis;
    a traveler movable relative to said frame between an extended position and a retracted position;
    a shaft extending from said frame to said traveler;
    a shutter driver mounted to said frame, said shutter driver selectively deflecting from a charged state to a discharged state;
    a shutter mounted on said shaft, said shutter being disposed in and movable with said traveler, said shutter being pivotable relative to said frame, about a pivot axis extending longitudinally through said shaft, from a closed position to an open position by said deflecting of said shutter driver from said charged state to said discharged state.

11. The camera of claim 10 wherein said shutter and said shaft are pivotable together about said pivot axis relative to said frame, from said closed position of said shutter to said open position of said shutter.

12. The camera of claim 11 further comprising a drive hub mounted on said shaft, and wherein said shutter is slidable along said shaft relative to said drive hub, said drive hub is directly contacted by said shutter driver during said deflecting, and said shutter, said shaft, and said drive hub are pivotable together about said pivot axis, relative to said frame, from said closed position of said shutter to said open position of said shutter.

13. A camera frame assembly comprising:
    a frame defining an optical axis;
    a shutter driver mounted to said frame, said shutter driver selectively deflecting from a charged state to a discharged state;
    a shutter assembly mounted to said frame, said shutter assembly having a drive hub directly contacted by said shutter driver during said deflecting, said shutter assembly having a shaft extending forward from said drive hub, said shutter assembly having a shutter mounted on said shaft, said shutter being pivotable from a closed position to an open position by said deflecting of said shutter driver from said charged state to said discharged state, said shutter being movable along said shaft, in directions parallel to said optical axis, between a inner position and an outer position.

14. The camera of claim 13 wherein said shutter is axially spaced apart from said drive hub in said inner and outer positions.

15. The camera of claim 13 wherein said shutter has a keyway, said shaft extends through said keyway, and said shaft has a cross-section complementary to said keyway, wherein said keyway blocks rotation of said shutter relative to said shaft.

16. The camera of claim 15 wherein said drive hub has a passage and said shaft extends through said passage.

* * * * *